US006855386B1

(12) United States Patent
Daniels et al.

(10) Patent No.: US 6,855,386 B1
(45) Date of Patent: Feb. 15, 2005

(54) WET SURFACE ADHESIVES

(75) Inventors: Michael P. Daniels, Inver Grove Heights, MN (US); Yen-Lane Chen, New Brighton, MN (US); Albert I. Everaerts, Oakdale, MN (US); Stephen E. Krampe, Maplewood, MN (US); James K. Young, Mahtomedi, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/367,455

(22) PCT Filed: Mar. 19, 1999

(86) PCT No.: PCT/US99/06063

§ 371 (c)(1),
(2), (4) Date: Aug. 13, 1999

(87) PCT Pub. No.: WO00/56828

PCT Pub. Date: Sep. 28, 2000

(51) Int. Cl.$^7$ .......................... B05D 3/02; B29D 22/00; B29D 23/00; B32B 1/08; C08L 33/08
(52) U.S. Cl. ................ 428/34.1; 427/372.2; 427/385.5; 524/366; 524/853
(58) Field of Search ................................. 524/366, 853; 428/34.1; 427/372.2, 385.5

(56) References Cited

U.S. PATENT DOCUMENTS

| | | |
|---|---|---|
| RE24,906 E | 12/1960 | Ulrich |
| 3,234,062 A | 2/1966 | Morris |
| 3,449,184 A | 6/1969 | Balk |
| 3,681,179 A | 8/1972 | Theissen |
| 3,772,262 A | 11/1973 | Clementi |
| 3,867,222 A | 2/1975 | Plant et al. |
| 4,035,549 A | 7/1977 | Kennar |
| 4,181,752 A | 1/1980 | Martens et al. |
| 4,234,533 A | 11/1980 | Langlands |
| 4,299,639 A | 11/1981 | Bayer |
| 4,303,485 A | 12/1981 | Levens |
| 4,329,384 A | 5/1982 | Vesley et al. |
| 4,330,590 A | 5/1982 | Vesley |
| 4,341,576 A | 7/1982 | Lewis |
| 4,358,329 A | 11/1982 | Masuda |
| 4,362,587 A | 12/1982 | Baudin et al. |
| 4,379,201 A | 4/1983 | Heilmann et al. |
| 4,385,951 A | 5/1983 | Pressau |
| 4,386,991 A | 6/1983 | Shiomi et al. |
| 4,431,471 A | 2/1984 | Mertens et al. |
| 4,452,840 A | 6/1984 | Sato et al. |
| 4,543,283 A | 9/1985 | Curtze et al. |
| 4,554,324 A | 11/1985 | Husman et al. |
| 4,599,274 A | 7/1986 | Ando et al. |
| 4,619,979 A | 10/1986 | Kotnour et al. |
| 4,671,913 A | 6/1987 | Gen et al. |
| 4,737,559 A | 4/1988 | Kellen et al. |
| 4,843,134 A | 6/1989 | Kotnour et al. |
| 4,925,725 A | 5/1990 | Endo et al. |
| 5,091,258 A | 2/1992 | Moran |
| 5,100,963 A | 3/1992 | Lin |
| 5,147,485 A | 9/1992 | Gajewski et al. |
| 5,178,933 A | 1/1993 | Yoshida et al. |
| 5,190,992 A | 3/1993 | Kato et al. |
| 5,254,388 A | 10/1993 | Melby et al. |
| 5,268,049 A | 12/1993 | Marriott et al. |
| 5,362,801 A | 11/1994 | Amici et al. |
| 5,407,971 A | 4/1995 | Everaerts et al. |
| 5,425,977 A | 6/1995 | Hopfe |
| 5,436,283 A | 7/1995 | Okada et al. |
| 5,445,890 A | 8/1995 | Bayha et al. |
| 5,455,103 A | 10/1995 | Hoagland et al. |
| 5,487,412 A | 1/1996 | Matthews et al. |
| 5,536,347 A | 7/1996 | Moran |
| 5,547,736 A | 8/1996 | Simon et al. |
| 5,595,818 A | 1/1997 | Hopfe et al. |
| 5,637,646 A | 6/1997 | Ellis |
| 5,741,542 A | 4/1998 | Williams et al. |
| 5,787,544 A * | 8/1998 | Meade ..................... 15/257.06 |
| 5,804,610 A | 9/1998 | Hamer et al. |
| 5,932,298 A | 8/1999 | Moon |
| 5,969,069 A | 10/1999 | Su et al. |
| 5,976,690 A | 11/1999 | Williams et al. |
| 6,294,249 B1 | 9/2001 | Hamer et al. |

FOREIGN PATENT DOCUMENTS

| | | |
|---|---|---|
| DE | 3926897 | 3/1991 |
| DE | 44 06 978 | 9/1995 |
| DE | 44 32 368 A | 3/1996 |
| EP | 0 056 719 B1 | 5/1987 |
| EP | 0 525 403 A1 | 2/1993 |
| EP | 0 670 338 A | 9/1995 |
| EP | 0 710 545 A1 | 5/1996 |
| EP | 853 092 | 7/1998 |
| GB | 2 155 856 | 10/1985 |
| JP | 51-89540 | 8/1976 |
| JP | 96073826 | 3/1996 |
| WO | WO 97/07161 | 2/1997 |
| WO | WO 98/29516 | 7/1998 |

OTHER PUBLICATIONS

Nichols, R.T. and R.M. Sowers, "Laminated Materials, Glass," *Kirk–Othmer Encyclopedia of Chemical Technology*, 4$^{th}$ Ed., pp. 1059–1074, 1995.

(List continued on next page.)

*Primary Examiner*—Patrick D. Niland
(74) *Attorney, Agent, or Firm*—Carolyn V. Peters; Jean A. Lown

(57) ABSTRACT

A wet stick pressure sensitive adhesive comprising the solventless polymerization product of: a) about 30 to about 70 parts by weight of an (meth)acrylate ester monomer wherein the (meth)acrylate ester monomer, when homopolymerized, has a Tg of less than about 10° C.; b) about 70 to about 30 parts by weight of a hydrophilic acidic comonomer; and c) about 10 to 100 parts based on 100 parts of the sum of components (a+b) of a non-reactive plasticizing agent, wherein the pressure sensitive adhesive adheres to wet substrate surfaces and a method of making.

24 Claims, No Drawings

OTHER PUBLICATIONS

Sung Gun Chu, Chapter 8, *Handbook of Pressure Sensitive Adhesive Technology,* Second Edition, Donatas Satas, Editor, pp. 158–203, 1989.

Masters, K., *Spray Drying: An Introduction to Principles, Operational Practice, and Application,* $2^{nd}$ edition, Wiley, NY, 1976, pp. 74–93.

Satas, D., *The Handbook of Pressure Sensitive Adhesive Technology,* $2^{nd}$ edition, Van Nostrand Reinhold, NY, 1989, pp. 172–173.

ASTM Designation: D 3654M–88 (Reapproved 1993), Standard Test Method for Holding Power of Pressure–Sensitive Tapes [Metric].

Fox, T. G., Bulletin of the American Physical Society (ser. 2), 12.3, J5 (1956).

Kirk–Othmer Encyclopedia of Chemical Technology, $4^{th}$ edition, John Wiley & Sons, NY, vol. 6, 1993, pp. 635–636.

Derwent abstract for DE 4432368A.

Derwent abstract for JP 08 295850A.

* cited by examiner

WET SURFACE ADHESIVES

FIELD OF THE INVENTION

This invention pertains to a pressure-sensitive adhesive and more particularly to a plasticizer-loaded pressure-sensitive adhesive, that provide bond formation useful for adhesion to wet surfaces.

BACKGROUND OF INVENTION

Pressure sensitive adhesives that adhere to wet or moist surfaces, so-called "wet-stick" adhesives, are useful in selected industrial, commercial and consumer applications. In pharmaceutical and other medical fields, such wet-stick adhesives are typically used for adhering articles such as tapes, bandages, dressings, and drapes to moist skin surfaces such as wounds or areas of the body prone to moistness. Wet-stick adhesives also find use in outdoor or exterior applications, such as on roadway materials, traffic control signage, and marine or automotive coatings and surfaces. Labels for food containers and other products that are exposed to moisture due to condensation or subjected to water or ice immersion also must be coated with wet-stick adhesives.

(Meth)acrylate pressure sensitive adhesives are attractive materials for many tape and label applications. (Meth)acrylates are known for their optical clarity, oxidative resistance and inherently tacky nature. Inherently tacky (meth)acrylate pressure sensitive adhesives (i.e., materials that require no additives such as tackifying resins) are typically formulated predominately from acrylic acid ester monomers of non tertiary alcohols. Examples of such monomers include n-butyl acrylate, 2-ethylhexyl acrylate, isooctyl acrylate, isononyl acrylate, isodecyl acrylate and dodecyl acrylate. When these (meth)acrylate monomers are polymerized, the homopolymers have a glass transition temperature (Tg) of less than 0° C. This low Tg is a necessary property in (meth)acrylate materials that exhibit tack at room temperature. Such (meth)acrylate polymers are hydrophobic in nature and, without modification, are generally unsuitable as wet-stick adhesives.

A means to increase the hydrophilic character of (meth)acrylate polymers is to copolymerize the (meth)acrylate monomers with hydrophilic acidic comonomers, such as acrylic acid, methacrylic acid, beta-carboxyethyl acrylate, itaconic acid, sulfoethyl acrylate and the like. Addition of these hydrophilic acidic comonomers in minor amounts (about 1 to about 15 wt %) can also enhance the internal or cohesive strength of the PSA. This increased polymer reinforcement, however, can diminish the tack of the hydrophilic acidic comonomer-containing (meth)acrylate copolymer.

At higher acidic comonomer levels, (meth)acrylate copolymers can dramatically lose their tack and become highly hydrophilic. When exposed to water, the moisture helps to transform these highly acidic, low tack compositions into tacky materials that are suitable as wet-stick adhesives used in many medical applications. When the water is allowed to evaporate, these adhesives lose their pressure-sensitive tack. Such compositions can also be useful as water-soluble or water dispersible adhesives. Water-dispersible or soluble (meth)acrylate copolymers can be formulated as repulpable adhesives used to splice dry paper rolls and designed to lose adhesive integrity and fully degrade when undergoing paper recycling operations.

When using high levels of acidic comonomers, it is difficult to effectively copolymerize these materials without a solvent, an aqueous reaction medium, or additives that promote interpolymerization of these monomers. Attempts to copolymerize these monomers in the absence of compatibilizing reaction media often results in heterogeneous materials dominated by glassy regions formed by the polymerization of the acidic comonomers and softer domains comprising the polymerized (meth)acrylate monomers. Thus, (meth)acrylate copolymers having high levels of acidic comonomers have traditionally been made using either solvent or water-based polymerization methods.

Such polymerization methods, however, have several drawbacks. Solvent-based processes have become increasingly undesirable because of the environmental and safety considerations associated with the use of solvents. Additionally, although the use of water-based polymerization methods avoids the use of solvents, water-based systems have not been satisfactory in some situations because of the amount of energy required to remove the water from the adhesives once coated and the problems associated with coating such water-based materials on moisture sensitive substrates.

SUMMARY OF INVENTION

Briefly, in one aspect of the present invention, a wet stick pressure sensitive adhesive is provided wherein the pressure sensitive adhesive comprises the solventless polymerization product of:

(a) about 30 to about 70 parts by weight of an (meth)acrylate ester monomer wherein the (meth)acrylate ester monomer, when homopolymerized, has a Tg of less than about 10° C.;

(b) about 70 to about 30 parts by weight of a hydrophilic acidic comonomer; and (c) about 10 to 100 parts based on 100 parts of the sum of components (a)+(b) of a non-reactive plasticizing agent, wherein the pressure sensitive adhesive adheres to wet substrate surfaces.

Advantageously, the pressure sensitive adhesives of the present invention are hydrophilic in character, but do not suffer the problems as described in the art. Heretofore unknown, the adhesives of the present invention are tacky, hydrophilic pressure sensitive adhesives.

In yet another aspect, a method for preparing a pressure sensitive adhesive for wet substrate surface adhesion is provided comprising the steps of:

(a) combining a solventless polymerizable mixture comprising:
   (i) about 30 to about 70 parts by weight of an (meth)acrylate ester monomer wherein the (meth)acrylate ester monomer, when homopolymerized, has a Tg of less than about 10° C.;
   (ii) about 70 to about 30 parts by weight of a hydrophilic acidic comonomer; and
   (iii) about 10 to 100 parts based on 100 parts of the sum of components (a)+(b) of a non-reactive plasticizing agent; and (b) polymerizing the solventless polymerizable mixture to form a pressure sensitive adhesive that adheres to wet substrate surfaces.

In yet another aspect of the present invention, a method for preparing a pressure sensitive adhesive for wet substrate surface adhesion is provided comprising the steps of:

(a) combining a solventless polymerizable mixture comprising:

(i) about 30 to about 70 parts by weight of an (meth) acrylate ester monomer wherein the (meth)acrylate ester monomer, when homopolymerized, has a Tg of less than about 10° C.;

(ii) about 70 to about 30 parts by weight of a hydrophilic acidic comonomer; and (iii) about 10 to 100 parts based on 100 parts (a)+(b) of a non-reactive plasticizing agent; and (b) enveloping the solventless polymerizable mixture in a packaging material; and (c) exposing the enveloped polymerizable mixture to radiation sufficient to polymerize the solventless polymerizable mixture and to form a pressure sensitive adhesive that adheres to wet substrate surfaces.

In another aspect of the present invention, a method for preparing a pressure sensitive adhesive for wet substrate surface adhesion is provided comprising the steps of:

(a) preparing a prepolymeric syrup comprising:

(i) about 30 to about 70 parts by weight of an (meth) acrylate ester monomer wherein the (meth)acrylate ester monomer, when homopolymerized, has a Tg of less than about 10° C.; and (ii) about 70 to about 30 parts by weight of a hydrophilic acidic comonomer; and (b) combining the prepolymeric syrup with about 10 to 100 parts based on 100 parts of the sum of components (i)+(ii) of a non-reactive plasticizing agent to form a polymerizable mixture; and (c) exposing the polymerizable mixture to radiation sufficient to polymerize the polymerizable mixture and to form a pressure sensitive adhesive that adheres to wet substrate surfaces.

A particular advantage of the present invention is the ability to copolymerize incompatible hydrophilic acidic comonomers with hydrophobic (meth)acrylate monomers, without a solvent or water. The polymerization methods of the present invention overcome the environmental and safety undesirability of using organic solvents. Furthermore, the methods of the present invention avoid using a water-based system, which in turn reduces the amount of energy that would be required to remove the water from the adhesives once coated. Additionally, the problems associated with coating such water-based materials on moisture sensitive substrates are avoided. Advantageously, polymerization in the presence of plasticizer prevents premature vitrification of the copolymers and provides for more complete conversion of the comonomers.

These solventless polymerization methods have been developed to reduce or eliminate the use of organic solvents or aqueous reaction media, such as water, in adhesives and their processing. Solventless adhesive systems are essentially 100% solid systems. Usually, such systems have no more than about 5% organic solvents or water, more typically no more than about 3% organic solvents or water. Most typically, such systems are free of organic solvents and water. Advantageously, by reducing the use of organic solvents and water, special handling and processing concerns associated therewith are also reduced.

As used herein in this application:

"pressure-sensitive adhesive" or "PSA" refers to a viscoelastic material that possesses the following properties: (1) aggressive and permanent tack, (2) adherence with no more than finger pressure, (3) sufficient ability to hold onto an substrate, and (4) sufficient cohesive strength to be removed cleanly from the substrate;

"wet-stick adhesive" refers to a material that exhibits pressure-sensitive adhesive properties when adhered to a substrate that has been flooded with water. Wet-stick adhesives may or may not demonstrate pressure-sensitive adhesive properties under dry conditions;

"(meth)acrylate monomers" are acrylic acid esters or methacrylic acid esters of non tertiary alcohols, the alcohols preferably having about 4 to 12 carbon atoms;

"hydrophilic acidic comonomers" are water soluble ethylenically unsaturated, free radically reactive monomers having carboxylic, sulfonic or phosphonic acid functionality and are copolymerizable with the (meth)acrylate monomers;

"compatible" refers to plasticizing agents that:

1) exhibit no gross phase separation from the wet stick adhesive composition when blended in the prescribed amounts, 2) once mixed with the wet stick adhesive composition, do not significantly phase separate from the wet stick adhesive composition upon aging, 3) function as a rheological modification agent for the wet stick adhesive composition, such that this plasticized composition exhibits pressure-sensitive properties as defined above, and 4) promotes high conversion polymerization, that is greater than 98% polymerization of the comonomers;

"non-reactive" refers to plasticizing agents that do not contain free radically reactive ethylenically unsaturated groups that could co-react with the comonomers or functionalities that significantly inhibit the polymerization of these monomers;

"non-volatile" refers to plasticizing agents that, when present in the wet stick adhesive composition of this invention, generate less than 3% VOC (volatile organic content). The VOC content can be determined analogously to ASTM D 5403-93 by exposing the coated composition to 100°±5° C. in a forced draft oven for 1 hour. If less than 3% plasticizing agent is lost from the plasticized pressure-sensitive adhesive composition, then the plasticizing agent is considered "non-volatile".

"solventless" refers to wet-stick adhesive polymerizable mixtures that are essentially 100% solid systems. Usually, such polymerizable mixtures have no more than about 5% organic solvents or water, more typically no more than about 3% organic solvents or water. Most typically, such polymerizable mixtures are free of organic solvents and water.

DESCRIPTION OF THE PREFERRED EMBODIMENT(S)

Generally, the wet-stick pressure-sensitive adhesive of the present invention comprises the solventless polymerization product of:

(a) about 30 to about 70 parts by weight of a (meth) acrylate ester monomer wherein the (meth)acrylate ester monomer, when homopolymerized, has a Tg of less than about 10° C.;

(b) about 70 to about 30 parts by weight of a hydrophilic acidic comonomer, and (c) about 10 to about 100 parts based on (a) and (b) of a non-reactive plasticizing agent, wherein the wet-stick pressure sensitive adhesive adheres to a wet substrate surface.

(Meth)acrylate Monomers

The wet-stick adhesives of the present invention contain at least one monofunctional unsaturated monomer selected from the group consisting of (meth)acrylate esters of non-tertiary alkyl alcohols, the alkyl groups of which preferably comprise from about 4 to about 12, more preferably about 4 to about 8 carbon atoms; and mixtures thereof. Preferred (meth)acrylate monomers have the following general Formula (I):

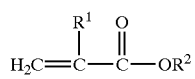

Formula (I)

wherein $R^1$ is H or $CH_3$, the latter corresponding to where the (meth)acrylate monomer is a methacrylate monomer. $R^2$ is broadly selected from linear or branched hydrocarbon groups and may contain one or more heteroatoms. The number of carbon atoms in the hydrocarbon group is preferably about 4 to about 12, and more preferably about 4 to about 8.

Examples of suitable (meth)acrylate monomers useful in the present invention include, but are not limited to, n-butyl acrylate, decyl acrylate, 2-ethylhexyl acrylate, hexyl acrylate, isoamyl acrylate, isodecyl acrylate, isononyl acrylate, isooctyl acrylate, lauryl acrylate, 2-methyl butyl acrylate, 4-methyl-2-pentyl acrylate, ethoxy ethoxyethyl acrylate and mixtures thereof. Particularly preferred are n-butyl acrylate, 2-ethylhexyl acrylate, isooctyl acrylate, lauryl acrylate, and mixtures thereof.

Hydrophilic Acidic Comonomers

Useful hydrophilic acidic comonomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, β-carboxyethyl acrylate, 2-sulfoethyl methacrylate, styrene sulfonic acid, 2-acrylamido-2-methylpropane sulfonic acid, vinyl phosphonic acid, and the like, and mixtures thereof. Due to their availability and effectiveness in reinforcing (meth)acrylate pressure sensitive adhesives, particularly preferred hydrophilic acidic monomers are the ethylenically unsaturated carboxylic acids, most preferably acrylic acid.

Minor amounts of monomers copolymerizable with the (meth)acrylate monomers and hydrophilic acidic monomers can be used. Examples of such monomers include (meth)acrylamides, vinyl esters and N-vinyl lactams.

The copolymerizable mixture of the present invention comprises, based upon 100 parts by weight total, about 30 to about 70 parts by weight of at least one (meth)acrylate monomer and about 70 to about 30 parts by weight of a hydrophilic acidic comonomer. Preferably, the copolymerizable mixture of the present invention comprises about 35 to about 65 parts by weight of at least one (meth)acrylate monomer and about 65 to about 35 parts by weight of a hydrophilic acidic comonomer. More preferably, the copolymerizable mixture of the present invention comprises about 40 to about 60 parts by weight of at least one (meth)acrylate monomer and about 60 to about 40 parts by weight of a hydrophilic acidic comonomer.

The ratio of each comonomer in the wet stick adhesive composition can be chosen to optimize the performance. For example, higher levels of the acidic comonomer can increase the overall Tg of the wet stick adhesive composition. However, the increased Tg (and modulus) may necessitate higher levels of plasticizing agent. Dependant on the desired end use, higher or lower levels of plasticizing agent may be beneficial. For example, if high cohesive strength is desired, typically lower levels of plasticizing agent are used. If aggressive tack or low peel resistance are desired, higher levels of plasticizing agent may be beneficial.

Plasticizing Agents

The plasticizing agents selected for use in the wet stick adhesive compositions of the present invention possess several properties. As mentioned earlier, the (meth)acrylate monomers and hydrophilic acidic comonomers are inherently incompatible co-reactants and, without a solvent or aqueous reaction medium, fail to significantly interpolymerize. Thus, it is critical that a compatible plasticizing agent be present during polymerization to serve as a polymerization medium for these co-reactants.

The plasticizing agent is also compatible with the polymerized wet-stick adhesive composition. Since the plasticizing agent also modifies the rheology and transforms the copolymer into a material having wet-stick adhesive properties, the plasticizing agent should be compatible with the copolymer. Any significant plasticizer bleeding or migration from the composition could result in loss of wet-stick adhesion properties.

Useful plasticizing agents are compatible with the wet stick adhesive composition, such that once the plasticizing agent is mixed with the comonomers or wet stick adhesive composition, the plasticizing agent does not phase separate. By "phase separation" or "phase separate", it is meant that by differential scanning calorimetry (DSC) no detectable thermal transition, such as a melting or glass transition temperature, can be found for the pure plasticizing agent in the wet stick adhesive composition. Some migration of the plasticizing agent from or throughout the wet stick adhesive composition can be tolerated, such as minor separation due to composition equilibrium or temperature influences, but the plasticizing agent does not migrate to the extent of phase separation between the wet stick adhesive composition and the plasticizing agent. Plasticizing agent compatibility with the wet stick adhesive composition can also be determined by the chemical nature of the plasticizing agent and the comonomers. For example, polymeric plasticizing agents based on polyether backbones (such as polyethylene glycols) are observed to be more compatible than polyester plasticizing agents, especially when higher levels of acidic comonomer such as acrylic acid are used.

For these same reasons, the plasticizing agent is also non-volatile. The plasticizing agent must remain present and stable under polymerization reaction conditions to serve as a polymerization medium for the marginally compatible (meth)acrylate monomers and hydrophilic acidic comonomers. To maintain wet-stick adhesion properties, the plasticizing agent must again remain present and not significantly evaporate from the polymerized wet-stick adhesive composition.

Additionally, the plasticizing agent is non-reactive to prevent reaction or interference with the polymerization of the copolymer formed from the (meth)acrylate monomers and hydrophilic acidic comonomers. Thus, plasticizing agents having acrylate functionality, methacrylate functionality, styrene functionality, or other ethylenically unsaturated free radically reactive functional groups are not used. Non-reactive plasticizing agents also reduce the inhibition or retardation of the polymerization reaction and/or the alteration of the final polymer structure that can occur if the plasticizing agent acts as a chain-transfer or chain-terminating agent. Such undesirable effects can adversely influence the performance and stability of the materials polymerized in the presence of these plasticizing agents. Chain termination can also result in undesirably high residual volatile materials (i.e., lower conversion of the comonomers).

Particularly useful plasticizing agents include polyalkylene oxides having weight average molecular weights of about 150 to about 5,000, preferably of about 150 to about 1,500, such as polyethylene oxides, polypropylene oxides, polyethylene glycols; alkyl or aryl functionalized polyalkylene oxides, such as PYCAL 94 (a phenyl ether of polyethylene oxide, commercially available from ICI Chemicals); benzoyl functionalized polyethers, such as Benzoflex 400 (polypropylene glycol dibenzoate, commercially available from Velsicol Chemicals) and monomethyl ethers of polyethylene oxides, and mixtures thereof.

The plasticizing agent can be used in amounts of from about 10 to 100 pph (parts:by weight per 100 parts of the (meth)acrylate monomers and hydrophilic acidic comonomers). Typically, the plasticizing agent is present in the adhesive in amounts from about 15 to 100 pph. Preferably, the plasticizing agent is present in amounts from about 30 to 100 pph. The amount of plasticizer required depends upon the type and ratios of the (meth)acrylate monomers and hydrophilic acidic comonomers employed in the polymerizable mixture and the chemical class and molecular weight of the plasticizing agent used in the composition.

Initiators

A free radical initiator is preferably added to aid in the copolymerization of (meth)acrylate comonomers and acidic comonomers. The type of initiator used depends on the polymerization process. Photoinitiators which are useful for polymerizing the polymerizable mixture monomers include benzoin ethers such as benzoin methyl ether or benzoin isopropyl ether, substituted benzoin ethers such as 2-methyl-2-hydroxypropiophenone, aromatic sulfonyl chlorides such as 2-naphthalenesulfonyl chloride, and photoactive oxides such as 1-phenyl-1, 1-propanedione-2-(o-ethoxycarbonyl) oxime. An example of a commercially available photoinitiator is IRGACURE 651 (2,2-dimethoxy-1,2-diphenylethane-1-one, commercially available from Ciba-Geigy Corporation,). Generally, the photoinitiator is present in an amount of about 0.005 to 1 weight percent based on the weight of the copolymerizable monomers. Examples of suitable thermal initiators include AIBN (2,2'-azobis (isobutyronitrile), hydroperoxides, such as tert-butyl hydroperoxide, and peroxides, such as benzoyl peroxide and cyclohexane peroxide.

Chain Transfer Agents

Optionally, the composition also includes a chain transfer agent to control the molecular weight of the polymerized compositions. Chain transfer agents are materials that regulate free radical polymerization and are generally known in the art. Suitable chain transfer agents include halogenated hydrocarbons such as carbon tetrabromide; sulfur compounds such as lauryl mercaptan, butyl mercaptan, ethanethiol, isooctylthioglycolate (IOTG), 2-ethylhexyl thioglycolate, 2-ethylhexyl mercaptopropionate, 2-mercaptoimidazole, and 2-mercaptoethyl ether and mixtures thereof.

The amount of chain transfer agent that is useful depends upon the desired molecular weight and the type of chain transfer agent. The chain transfer agent is typically used in amounts from about 0.001 part to about 10 parts by weight per 100 parts of total monomer, and preferably from about 0.01 part to about 0.5 part, and most preferably from about 0.02 part to about 0.20 part.

Solventless Polymerization Processes

Solventless polymerization methods, such as the continuous free radical polymerization method described in U.S. Pat. Nos. 4,619,979 and 4,843,134; the essentially adiabatic polymerization methods using a batch reactor described in U.S. Pat. No. 5,637,646; and, the methods described for polymerizing packaged polymerizable mixtures described in U.S. Pat. No. 5,804,610 may also be utilized to prepare the polymers.

In one preferred embodiment of this latter method, from 0.1 to 500 g of the polymerizable mixture comprising the (meth)acrylate monomers, hydrophilic acidic comonomers, plasticizing agent, initiator, and optional chain transfer agent is completely surrounded by a packaging material. In another preferred embodiment, from 3 to 100 g of the polymerizable mixture is surrounded by the packaging material. In another embodiment of the invention, the polymerizable mixture is substantially surrounded by the packaging material. In yet another embodiment, the polymerizable mixture is disposed on the surface of a sheet, or between a pair of two substantially parallel sheets of the packaging material. In another embodiment of the invention, the polymerizable mixture is substantially or completely surrounded by a hollow profile of packaging material with a length::square root of the cross-sectional area ratio of at least 30:1.

The packaging material is made of a material that when combined with the adhesive does not substantially adversely affect the desired adhesive characteristics. A hot melt coated adhesive produced from a mixture of the adhesive and the packaging material may have improved adhesive properties compared to hot melt coated adhesive produced from adhesive alone.

The packaging material preferably melts at or below the processing temperature of the adhesive (i.e., the temperature at which the adhesive flows). The packaging material preferably has a melting point of 200° C. or less, preferably 170° C. or less. In a preferred embodiment the melting point ranges from 90° C. to 150° C. The packaging material may be a flexible thermoplastic polymeric film. The packaging material is preferably selected from ethylene-vinyl acetate, ethylene-acrylic acid, polypropylene, polyethylene, polybutadiene, or ionomeric films. In a preferred embodiment the packaging material is an ethylene-acrylic acid or ethylene-vinyl acetate film.

The amount of packaging material depends upon the type of material and the desired end properties. The amount of packaging material typically ranges from about 0.5 percent to about 20 percent of the total weight of the polymerization mixture and the packaging material. Preferably, the packaging material is between 2 percent and 15 percent by weight, and more preferably between 3 percent and 5 percent. Such packaging materials may contain plasticizers, stabilizers, dyes, perfumes, fillers, slip agents, antiblock agents, flame retardants, anti-static agents, microwave receptors, thermally conductive particles, electrically conductive particles, and/or other materials to increase the flexibility, handleability, visibility, or other useful property of the film, as long as they do not adversely affect the desired properties of the adhesive.

The packaging material should be appropriate for the polymerization method used. For example, with photopolymerization, it is necessary to use a film material that is sufficiently transparent to ultraviolet radiation at the wavelengths necessary to effect polymerization.

The transmissive energy may be selected from ultraviolet radiation, visible radiation, thermal radiation, or thermal conduction. The transmissive energy is preferably ultraviolet radiation or thermal conduction. Preferably, at least 80 percent of the pre-adhesive is converted to adhesive; more preferably, at least 90 percent of the pre-adhesive is converted to adhesive.

Thermal polymerization can be effected by immersing the packaged composition in a heat exchange medium at temperatures between about 40° C. and 100° C. for a time sufficient to polymerize the composition. The heat exchange medium may be a forced or impinged gas or a liquid such as water, perfluorinated liquids, glycerin, or propylene glycol. The heat necessary for thermal polymerization may also be provided by a metal platen, heated metal rolls, or microwave energy.

The temperature at which the polymerization occurs depends upon the activation temperature of the initiator. For example, polymerization using VAZO 64, a commercially available initiator from DuPont Company can be carried out at about 65° C., while VAZO 52, also available from DuPont Company, can be used at about 45° C.

It is preferable to carry out the polymerization in an appropriate liquid heat exchange medium at a controlled temperature. A suitable liquid heat exchange medium is water, heated to the desired reaction temperature. Commercially available heat transfer fluids may also be used. Additional information concerning thermal polymerization may be found in U.S. Ser. No. 08/234,468, filed Apr. 26, 1994, entitled "Thermal Free-Radical Cure Adhesives and Articles Made Thereby," the contents of which are hereby incorporated by reference.

Polymerization can also be effected by exposure to ultraviolet (UV) radiation as described in U.S. Pat. No. 4,181, 752. In a preferred embodiment, the polymerization is carried out with UV black lights having over 60 percent, and preferably over 75 percent of their emission spectra between 280 to 400 nanometers (nm), with an intensity between about 0.1 to about 25 mW/cm$^2$.

During photopolymerization it is desirable to control the temperature by blowing cooling air around the packaged polymerizable mixture, by running the packaged polymerizable mixture over a cooled platen, or by immersing the packaged polymerizable mixture in a water bath or a heat transfer fluid during polymerization. Preferably, the packaged polymerizable mixtures are immersed in a water bath, with water temperatures between about 5° C. and 90° C., preferably below about 30° C. Agitation of the water or fluid helps to avoid hot spots during the reaction.

The packaged polymerized wet-stick adhesive compositions may be used to make a coatable hot melt adhesive by introducing the adhesive and its packaging material into a vessel in which the adhesive and its packaging material are melted. This hot melt adhesive may be used to form a pressure sensitive adhesive sheet by coating the melted adhesive and its packaging material onto a sheet material or another suitable substrate. The sheet material is preferably selected from a tape backing or a release liner. Preferably, the polymerized adhesives are hot melt coated by putting the packaged adhesive in a hot melt coater at a temperature sufficient to melt the packaged adhesive and with sufficient mixing to form a coatable mixture, which is coated onto a substrate. This step can be done conveniently in a heated extruder, bulk tank melter, melt-on-demand equipment, or a hand-held hot melt adhesive gun.

For example, the coatable hot melt adhesive can be delivered out of a film die and subsequently contacting the drawn adhesive to a moving plastic web or other suitable substrate. A related coating method involves extruding the coatable hot melt adhesive and a coextruded backing material from a film die and cooling the layered product to form an adhesive tape. Other forming methods involve directly contacting the coatable hot melt adhesive to a rapidly moving plastic web or other suitable preformed substrate. Using this method, the adhesive blend is applied to the moving preformed web using a die having flexible die lips, such as a rotary rod die. After forming by any of these continuous methods, the adhesive films or layers can be solidified by quenching using both direct methods (e.g., chill rolls or water baths) and indirect methods (e.g., air or gas impingement).

The packaged adhesive composition may further comprise an effective amount of a crosslinking agent that may be activated after the adhesive has been hot melt coated. Typically, the amount ranges from about 0.01 to about 5.0 parts based upon 100 parts of the (meth)acrylate monomers and the hydrophilic acidic comonomers. The crosslinking agent can be added to the polymerized adhesive before or during hot melt coating, or it can be added to the polymerizable mixture. When added to the polymerizable mixture, the crosslinking agent can remain intact as a separate species in the adhesive, or it can be co-polymerized with the monomers. Crosslinking is preferably initiated after hot melt coating, and the crosslinking is preferably initiated by ultraviolet radiation, or ionizing radiation such as gamma radiation or electron beam (the use of separate crosslinking agents being optional in the case of ionizing radiation). Preferred crosslinking agents that can be added after polymerization and before hot melt coating include multifunctional (meth)acrylates such as 1,6hexanedioldiacrylate and trimethylolpropane triacrylate, and substituted triazines such as 2,4-bis(trichloromethyl)-6-(4-methoxyphenyl)-s-triazine and 2,4bis(trichloromethyl)-6(3,4dimethoxyphenyl)-s-triazine, as described in U.S. Pat. Nos. 4,329,384 and 4,330,590. Another class of preferred crosslinking agents are the copolymerizable monoethylenically unsaturated aromatic ketone comonomers free of ortho-aromatic hydroxyl groups such as those disclosed in U.S. Pat. No. 4,737,559. Specific examples include para-acryloxybenzophenone, para-acryloxyethoxybenzophenone, para-N-(methylacryloxyethyl)-carbamoylethoxybenzophenone, para-acryloxyacetophenone, ortho-acrylamidoacetophenone, acrylated anthraquinones, and the like.

Yet another class of suitable crosslinking agents are the multifunctional radiation-activatable crosslinking agents described in PCT Patent Application WO 97/07161 (assigned to 3M Company), and in U.S. Pat. No. 5,407,971. An example of these crosslinking agents is 1,5-bis(4-benzoylbenzoxy) pentane. Also suitable are hydrogen-abstracting carbonyls such as anthraquinone, benzophenone, and derivatives thereof, as disclosed in U.S. Pat. No. 4,181, 752, hereby incorporated by reference.

The acrylate copolymers can be crosslinked by exposure to ultraviolet radiation from, for example, medium pressure mercury arc lamps. It is preferred that crosslinking agents activated by ultraviolet radiation be primarily activated by a different wavelength of energy than that used for the polymerization. For example, low intensity black lights may be used for polymerization and mercury arc lamps may be used for the subsequent crosslinking.

The steps may be done in-line, i.e., the polymerizable mixture may be surrounded by the packaging material, polymerized, hot melt coated to form a tape, and optionally crosslinked, or the steps may be performed individually at separate times and sites. For example, the packaged prepolymerized mixture may be polymerized at one time, and extruded and crosslinked at another time.

In another preferred bulk polymerization method, the wet-stick (meth)acrylate pressure sensitive adhesives of the present invention are prepared by photoinitiated polymerization methods according to the technique described in U.S.

Pat. No. 4,181,752, hereby incorporated by reference. The (meth)acrylate monomers, hydrophilic acidic comonomers, plasticizing agent and a photoinitiator are mixed together in the absence of solvent and partially polymerized to a viscosity in the range of from about 500 cps to about 50,000 cps to achieve a coatable syrup. Alternatively, the (meth)acrylate monomers, hydrophilic acidic comonomers, plasticizing agent may be mixed with a thixotropic agent such as fumed hydrophilic silica to achieve a coatable thickness. The crosslinking agent and any other ingredients are then added to the prepolymerized syrup. Alternatively, these ingredients (with the exception of the crosslinking agent) can be added directly to the monomer mixture prior to prepolymerization.

The resulting composition is coated onto a substrate (which may be transparent to ultraviolet radiation) and polymerized in an inert (i.e., oxygen free) atmosphere, e.g., a nitrogen atmosphere by exposure to ultraviolet radiation. Examples of suitable substrates include release liners (e.g., silicone release liners) and tape backings (which may be primed or unprimed paper or plastic). A sufficiently inert atmosphere can also be achieved by covering a layer of the polymerizable coating with a plastic film which is substantially transparent to ultraviolet radiation, and irradiating through that film in air as described in the aforementioned patent using ultraviolet lamps. Alternatively, instead of covering the polymerizable coating, an oxidizable tin compound may be added to the polymerizable syrup to increase the tolerance of the syrup to oxygen as described in U.S. Pat. No. 4,303,485. The ultraviolet light source preferably has 90% of the emissions between 280 and 400 nm (more preferably between 300 and 400 nm), with a maximum at 351 nm.

The polymerizable mixture may also contain a crosslinking agent, or a combination of crosslinking agents, to increase the shear strength of the adhesive. Useful crosslinking agents include substituted triazines such as 2,4,-bis(trichloromethyl)-6-(4-methoxy phenyl)-s-triazine, 2,4-bis(trichloromethyl)-6-(3,4-dimethoxyphenyl)-s-triazine, and the chromophore-substituted halo-s-triazines disclosed in U.S. Pat. Nos. 4,329,384 and 4,330,590 incorporated herein by reference. Other useful crosslinking agents include multifunctional alkyl (meth)acrylate monomers such as trimetholpropane triacrylate, pentaerythritol tetra-acrylate, 1,2 ethylene glycol diacrylate, 1,4 butanediol diacrylate, 1,6 hexanediol diacrylate, and 1,12 dodecanol diacrylate. Various other crosslinking agents with different molecular weights between (meth)acrylate functionality would also be useful. Generally, the crosslinker is present in an amount of about 0.005 to 1 weight percent based on the combined weight of the monomers.

Other Additives

Other additives can be included in the polymerizable mixture or added at the time of compounding or coating to change the properties of the adhesive. Such additives, or fillers, include pigments, glass or polymeric bubbles or beads (which may be expanded or unexpanded), fibers, reinforcing agents, hydrophobic or hydrophilic silica, toughening agents, fire retardants, antioxidants, finely ground polymeric particles such as polyester, nylon, and polypropylene, and stabilizers. The additives are added in amounts sufficient to obtain the desired end properties.

The wet stick pressure sensitive adhesives of the present invention that adhere to wet or moist surfaces are useful in many industrial, commercial and consumer applications. For example, these wet stick adhesives are useful in medical applications, such as tapes, bandages, dressings, and drapes to adhere to moist skin surfaces such as wounds or areas of the body prone to moistness. Additionally, wet stick adhesives also find use in outdoor or exterior applications, such as on roadway materials, traffic control signage, and marine or automotive coatings and surfaces. Furthermore, labels for food containers and other products that are exposed to moisture due to condensation or subjected to water or ice immersion also must be coated with wet-stick adhesives.

This invention is further illustrated by the following examples that are not intended to limit the scope of the invention. In the examples, all parts, ratios and percentages are by weight unless otherwise indicated. The following test methods were used to evaluate and characterize the wet stick adhesive compositions produced in the examples. All materials are commercially available, for example from Aldrich Chemicals (Milwaukee, Wis.), unless otherwise indicated or described.

EXAMPLES

Test Methods

Peel Adhesion

Peel adhesion is the force required to remove an adhesive-coated, flexible sheet, material from a test panel. Peel adhesion is measured at a specific angle and rate of removal. Peel adhesions in the range of 3 N/dm or higher, as measured by the following procedure are generally considered acceptable as wet stick adhesives according to the present invention. In the following examples, this peel adhesion force is expressed in Newtons/decimeter width (N/dm) of the coated sheet.

The procedure followed was:

A strip (1.27 centimeter wide) of the adhesive-coated sheet was applied to the horizontal surface of a clean test plate with at least 5 lineal centimeters of both surfaces being in firm contact. One pass with a 2-kilogram hard rubber roller was used to laminate the strip to the plate. The free end of the coated strip was doubled back nearly touching itself so the angle of removal was 180°. The free end was attached to the adhesion tester scale. The glass test plate was clamped in the jaws of a tensile testing machine that was capable of moving the plate away from the scale at a constant rate of 30 centimeters/minute. The scale reading was recorded in Newtons as the tape was peeled from the glass surface. The data was reported as the average of the range of numbers observed during the test.

Compliance Test Method

Compliance values can be obtained using a modified version of the Creep Compliance Procedure described in U.S. Pat. No. 4,737,559, the disclosure of which is incorporated herein by reference. The release liner is removed from a sample of the material to be tested. The exposed adhesive surface is folded back on itself or is laminated to itself in the lengthwise direction to produce a "sandwich" configuration, i.e., backing/adhesive/backing. Two test samples of equal area are cut using a rectangular die. One test sample is centered on the stationary plate of a shear-creep rheometer with the long axis of the test sample centered on the short axis of the plate. The small non-stationary plate of the shear-creep rheometer is centered over the first sample on the stationary plate. The second test sample is centered on the upper surface of the small non-stationary plate matching the axial orientation of the first test sample. The large stationary plate is placed over the second test sample and the entire assembly is fixed so that only the non-stationary plate can be moved. An electronic device which measures displacement is attached to one end of the non-stationary plate. On the opposite side of the plate, a small hook allows a weight (e.g. 500 grams) to be affixed to provide a stress for sample displacement. The compliance is then calculated using the equation:

$$J=2$$

where A is the area of one face of the test sample, h is the thickness of the adhesive mass (i.e., two times the matrix thickness of the sample being tested), X is the displacement and f is the force due to the mass attached to the string. Where A is expressed in $cm^2$, h in cm, X in cm and f in dynes, the compliance value is given in $cm^2/dyne$.

In Vivo Bioadhesion

The wet-stick acrylate adhesives were also tested for in vivo bioadhesion. Tape samples were weighed and then gently placed using a light pressure on the dried upper gingival tissue of female beagle dogs. The dogs were allowed to eat and drink as usual. After 24 hours, the samples were removed from the gingival surface. For each sample, a removal resistance rating was assigned (1=removes easily; 9=most resistant to removal). Water uptake was also measured by weighing the removed sample and recording the water uptake as the weight increase (in percent) over the sample's initial weight.

Glossary

| | |
|---|---|
| 2EHA | 2-ethylhexyl acrylate |
| AA | acrylic acid |
| BRIJ 30 | Polyoxyethylene (4) lauryl ether (commercially available from ICI Americas, Inc.) |
| BRIJ 52 | Polyoxyethylene 10 oleyl ether (commercially available from ICI Americas, Inc.) |
| IOA | isooctyl acrylate |
| IOTG | isooctyl thioglycolate |
| IRG 651 | IRGACURE 651, a 2,2-dimethoxy-2-phenyl acetophenone photoinitiator (commercially available from Ciba Geigy Co.) |
| IRG 184 | IRGACURE 184, a hydroxycyclohexyl phenyl ketone photoinitiator (commercially available from Ciba Geigy Co.) |
| IRG 1076 | IRGANOX 1076, an octadecyl 8 (3,5-tert-butyl-4-hydroxyphenol) propionate antioxidant (commercially available from Ciba Geigy Co.) |
| LA | lauryl acrylate |
| MPEG 550 | CARBOWAX MPEG 550 a methoxypolyethylene glycol having a molecular weight of approximately 550 (commercially available from Union Carbide Corp.) |
| PPG 1000 | polypropylene glycol having molecular weight of approximately 1000 (commercially available from Aldrich Chemical) |
| pph | parts per hundred |
| PYCAL 94 | a phenyl ether of polyethylene oxide plasticizer (commercially available from ICI Chemicals, Inc.) |
| TMN-3 | TERGITOL TMN-3, A 2,6,8-trimethyl-4-nonoxy ether of polyethylene oxide having a molecular weight of 312 (commercially available from Union Carbide Corp.) |
| TRITON X35 | TRITON Nonionic Surfactant X-35, an octylphenoxy ether of polyethylene oxide having 3 ethylene oxide repeating units (commercially available from Union Carbide Corp.) |
| TRITON X114 | TRITON Nonionic Surfactant X-35, an octylphenoxy ether of polyethylene oxide having 7–8 ethylene oxide repeating units (commercially available from Union Carbide Corp.) |

EXAMPLES 1–13
Preparation of Packaged Polymerized Acrylate Wet-Stick Adhesive Compositions Packaged polymerized acrylate wet stick adhesive composition were packaged, polymerized, coated and tested according to the following method: Two sheets of a heat sealable ethylene vinyl acetate film having a thickness of 64 micrometers and a 6 mole % vinyl acetate content (VA24, commercially available from Consolidated Thermoplastics Co.; Schaumburg, Ill.) were heat sealed on the lateral edges and the bottom to form a rectangular pouch measuring approximately 5 cm wide. The polymerizable mixtures comprising the (meth)acrylate monomers, hydrophilic acidic comonomers, plasticizing agent, initiators and chain transfer agents described in Table 1 were prepared and 20 ml of each mixture was delivered via syringe into the unsealed edge of the pouch. The unsealed edge of the filled pouch was then heat sealed to form 5 cm by 8.9 cm pouches containing 19 grams of the polymerizable mixture.

The pouches were placed in a water bath that was maintained between about 16° C. and exposed to ultraviolet radiation at an intensity of about 3.5 $mW/Cm^2$ for 8.5 minutes (UV Exp Time). The radiation was supplied from lamps having about 90% of the emissions between 300 and 400 nanometers (nm), and a peak emission at 351 nm.

TABLE 1

| Ex. | Acrylate (parts) | Acrylic Acid (parts) | Plasticizing Agent (parts) | IOTG (parts) | IRG 184 (parts) | IRG 1076 (parts) |
|---|---|---|---|---|---|---|
| 1 | IOA (50) | 50 | PYCAL 94 (43) | 0.07 | 0.15 | 0.2 |
| 2 | LA (50) | 50 | PYCAL 94 (43) | 0.07 | 0.15 | 0.2 |
| 3 | IOA (50) | 50 | MPEG 550 (43) | 0.07 | 0.15 | 0.2 |
| 4 | LA (50) | 50 | MPEG 550 (43) | 0.07 | 0.15 | 0.2 |
| 5 | IOA (50) | 50 | BRIJ 30 (43) | 0.07 | 0.15 | 0.2 |
| 6 | IOA (50) | 50 | BRIJ 52 (43) | 0.07 | 0.15 | 0.2 |
| 7 | IOA (50) | 50 | TRITON X35 (43) | 0.07 | 0.15 | 0.2 |
| 8 | IOA (50) | 50 | TRITON X114 (43) | 0.07 | 0.15 | 0.2 |
| 9 | IOA (50) | 50 | TMN-3 (43) | 0.07 | 0.15 | 0.2 |
| 10 | 2EHA (50) | 50 | PYCAL 94 (43) | 0.07 | 0.15 | 0.2 |
| 11 | 2EHA (50) | 50 | MPEG 550 (43) | 0.07 | 0.15 | 0.2 |
| 12 | 2EHA (50) | 50 | BRIJ 30 (43) | 0.07 | 0.15 | 0.2 |
| 13 | 2EHA (50) | 50 | TRITON X35 (43) | 0.07 | 0.15 | 0.2 |

Two pouches of each mixture were then blended on a Brabender Prep Center (commercially available from Brabender Technologie Inc.; Mississauga, Ontario CA) using the 30 cc bowl at a bowl temperatures set at about 130° C. The mixed compositions were allowed to cool to room temperature overnight and then cut to strips and fed into an single screw extruder (Randcastle Microtruder, commercially available from Randcastle Extrusion Systems; Cedar Grove, N.J.). The extruder barrel was heated to temperatures of from about 120° C. to about 150° C. in three zones and the 2 inch wide coating die was heated to a temperature of 150° C. The compositions were coated at 50 micrometers (for peel adhesion and compliance testing) and 375 micrometers (for in vivo bioadhesion testing) thicknesses onto a release liner that was treated on both sides with a silicone release coating. For peel adhesion and compliance testing purposes, tape samples were prepared by transferring the coated composition to a primed polyester backing having a thickness of 12.5 micrometers. For in vivo testing, the 375 micrometer thick coatings were cut into oblong patches (0.5 cm×1.8 cm) and applied to the upper gingival tissue, on Beagle dogs, after excessive saliva were wiped clear with a gauze pad.

Both "wet" and "dry" peel adhesion and compliance of these samples were measured as described above against a polypropylene test plate. The "wet" peel adhesion and compliance measurements were collected by first touching the surface of the adhesive composition against water for 30 seconds just prior to application to the substrate or testing, in the case of compliance. The results of tests are recorded in Table 2.

TABLE 2

| Ex. | Peel Adhesion - Dry (N/dm) | Peel Adhesion - Wet (N/dm) | Compliance - Dry (× $10^{-5}$ cm$^2$/dyne) | Compliance - Wet (× $10^{-5}$ cm$^2$/dyne) |
|---|---|---|---|---|
| 1 | 46 | 61.3 | 1.3 | 9.7 |
| 2 | 39.4 | 59.1 | 0.3 | 1.8 |
| 3 | 46 | 78.8 | 0.5 | 2.1 |
| 4 | 39.4 | 30.6 | 0.5 | 2.4 |
| 5 | 24.1 | 74.4 | 0.5 | 1.7 |
| 6 | 0 | 10.9 | 0.2 | 0.2 |
| 7 | 0 | 147 | 0.2 | 1.3 |
| 8 | 10.9 | 123 | 0.5 | 0.7 |
| 9 | 13.1 | 144 | 0.3 | 1.1 |
| 10 | 30.6 | 59.1 | 0.5 | 1.1 |
| 11 | 54.7 | 59.1 | 0.5 | 2.4 |
| 12 | 24.1 | 85.4 | 0.5 | 2.5 |
| 13 | 0 | 129 | 0.3 | 1.5 |

In vivo bioadhesion testing was also performed on the 375 micrometer coated samples according to the above described method. Results of these tests can be found in Table 3.

TABLE 3

| Ex. | In Vivo Removal Resistance | In Vivo Water Uptake (%) |
|---|---|---|
| 1 | 6 | 30 |
| 2 | 4.5 | 30 |
| 3 | 1.5 | 63 |
| 4 | 0.5 | 87 |
| 5 | 4.5 | 25 |
| 6 | 4 | 30 |
| 7 | 6 | 15 |
| 8 | 9 | 20 |
| 9 | 7 | 18 |
| 10 | 3 | 22 |
| 11 | 1 | 50 |
| 12 | 9 | -2 |
| 13 | 6 | 18 |

EXAMPLES 14–16 AND COMPARATIVE EXAMPLE C1

Preparation of Packaged Polymerized Acrylate Wet-Stick Adhesive Compositions without Antioxidant Example 14–16 were packaged and polymerized the using the same methods as Examples 1–13, except that no IRGANOX 1076 antioxidant was added and the photoinitiator was changed to IRGACURE 651. Comparative Example C1 is a conventional acrylic pressure-sensitive adhesive formulation and serves as a reference composition. These compositions are described in Table 4.

TABLE 4

| Ex. | Acrylate (parts) | Acrylic Acid (parts) | Plasticizing Agent (parts) | IOTG (parts) | IRG 651 (parts) |
|---|---|---|---|---|---|
| 14 | IOA (50) | 50 | PYCAL 94 (43) | 0.07 | 0.15 |
| 15 | IOA (50) | 50 | MPEG 550 (43) | 0.07 | 0.15 |
| 16 | IOA (50) | 50 | PPG 1000 (43) | 0.07 | 0.15 |
| C1 | IOA (90) | 10 | None | 0.07 | 0.15 |

The packaged polymerized adhesives were melt processed, coated at a thickness of 50 micrometers onto a siliconized release liner, and the coating transferred onto a 25 micrometer thick biaxially oriented polypropylene backing to form tape samples for "dry" and "wet" peel adhesion testing against a variety of non-biological test plates. "Wet" testing was done by flooding the test plate surface with water and then laying the tape sample on the surface of the water for 15 seconds and then pressing the construction through the water with a 5 cm wide by 3.75 cm diameter rubber roller onto the test panel. Peel tests were performed within 30 minutes of application to the surface. Results of these tests are found in Table 5.

TABLE 5

| | Peel Adhesion (N/dm) | | | | | | | |
|---|---|---|---|---|---|---|---|---|
| Surface | 14 Dry | 14 Wet | 15 Dry | 15 Wet | 16 Dry | 16 Wet | C1 Dry | C1 Wet |
| Aluminum E & D | 39 | 1.3 | 40.3 | 13.6 | 73.6 | 60.6 | 36.6 | 6.6 |
| Aluminum Chromium | 27.1 | 42.2 | 31.5 | 78.8 | 22.5 | 81 | 34.1 | 33.1 |
| 304-2B Stainless Steel | 51.7 | 41.8 | 54.5 | 74.4 | 122 | 72 | 43.8 | 13.8 |
| Polypropylene | 3.1 | 14.9 | 4.6 | 13.8 | 1.8 | 32.8 | 14 | 13.1 |
| HDPE | 2.2 | 31.7 | 8.8 | 14 | 1.1 | 14.7 | 10.1 | 7.2 |
| Filon FRP | 12.7 | 36.8 | 6.6 | 16.9 | 1.8 | 28 | 0 | 0 |
| Polycarbonate | 14.4 | 45.5 | 14.2 | 10.9 | 2.6 | 69.8 | 24.7 | 40.1 |
| Ford White Paint | 17.1 | 42.5 | 15.1 | 43.3 | 3.7 | 63.3 | 12 | 25.2 |
| Frauehoff White Paint | 10.5 | 85.4 | 17.7 | 16.2 | 1.8 | 30.4 | 0 | 0 |
| NiZn | 23.4 | 50.1 | 27.8 | 47.1 | 5.9 | 78.2 | 19 | 17.5 |
| Glass (soda lime) | 31.5 | 8.5 | 36.6 | 0.9 | 48.6 | 21.7 | 26.9 | 3.5 |

EXAMPLES 17–23

Preparation of Packaged Polymerized Acrylate Wet-Stick Adhesive Compositions without Antioxidant and Coated from Solvent Examples 17–23 were packaged and polymerized the using the same methods as Examples 1–13, except that no IRGANOX 1076 antioxidant was added. These compositions are described in Table 6. The compositions were removed from the pouches and dissolved into isopropanol solvent to form a 30% solution of the wet-stick acrylate adhesive composition. The solutions were then knife coated onto a siliconized release liner and dried in a 200 F oven for 30 minutes forming an adhesive coating having a thickness of 50 micrometers. A woven acetate backing having 75 denier warp direction and 150 denier in the fill direction was pressed against the coated composition and the construction was then cut into 2.5 cm wide tape samples and tested for peel adhesion from dry and wet human skin test surfaces. Prior to applying the tape samples to the wet skin surface, a wet towel was placed on the test skin surface for 15 minutes to moistened the skin surface. The test samples were peeled within 15 minutes of application. The results of these peel adhesion tests are found in Table 6.

TABLE 6

| Ex. | IOA (parts) | Acrylic Acid (parts) | MPEG 550 (parts) | IOTG (parts) | IRG 184 (parts) | Peel Adhesion- Dry Skin (N/dm) | Peel Adhesion- Wet Skin (N/dm) |
| --- | --- | --- | --- | --- | --- | --- | --- |
| 17 | 50 | 50 | 42.86 | 0.07 | 0.14 | 1.4 | 2.3 |
| 18 | 57.14 | 42.86 | 42.86 | 0.07 | 0.14 | 2.2 | 3.5 |
| 19 | 64.29 | 35.71 | 42.86 | 0.07 | 0.14 | 3.1 | 9.3 |
| 20 | 61.54 | 38.46 | 53.85 | 0.07 | 0.14 | 4.6 | 10.8 |
| 21 | 58.33 | 41.67 | 66.67 | 0.07 | 0.14 | 2.6 | 4.6 |
| 22 | 53.85 | 46.15 | 53.85 | 0.07 | 0.14 | 5.5 | 8.8 |
| 23 | 57.50 | 42.50 | 50.02 | 0.07 | 0.14 | 8.1 | 10.1 |

Various modifications and alterations of this invention will become apparent to those skilled in the art without departing from the scope and principles of this invention, and it should be understood that this invention is not to be unduly limited to the illustrative embodiments set forth hereinabove. All publications and patents are incorporated herein by reference to the same extent as if each individual publication or patent was specifically and individually indicated to be incorporated by reference.

What is claimed:

1. A hot melt pressure sensitive adhesive comprising a pressure sensitive adhesive having a flow temperature and a thermoplastic packaging material enveloping said wet stick pressure sensitive adhesive, said thermoplastic packaging material having a melting temperature lower than the flow temperature of the pressure sensitive adhesive, wherein said pressure sensitive adhesive comprises the polymerization product of:
    (a) about 30 to about 70 parts by weight of an (meth) acrylate ester monomer wherein the (meth)acrylate ester monomer, when homopolymerized, has a Tg of less than about 10° C.;
    (b) about 70 to about 30 parts by weight of a hydrophilic acidic comonomer; and
    (c) about 10 to 100 parts based on 100 parts (a)+(b) of a non-reactive plasticizing agent,
    wherein the pressure sensitive adhesive adheres to wet substrate surfaces.

2. The hot melt pressure sensitive adhesive according to claim 1 wherein the (meth)acrylate ester monomers has the following general formula:

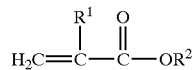

wherein $R^1$ is H or $CH_3$, the latter corresponding to where the (meth)acrylate monomer is a methacrylate monomer and $R^2$ is linear or branched hydrocarbon groups and may contain one or more heteroatoms and the number of carbon atoms in the hydrocarbon group is about 4 to about 12.

3. The hot melt pressure sensitive adhesive according to claim 2 wherein the (meth)acrylate ester monomer is n-butyl acrylate, 2-ethylhexyl acrylate, isooctyl acrylate, lauryl acrylate, or mixture thereof.

4. The hot melt pressure sensitive adhesive according to claim 1 wherein the hydrophilic acidic monomer is ethylenically unsaturated carboxylic acids, ethylenically unsaturated sulfonic acids, ethylenically unsaturated phosphonic acids, or mixtures thereof.

5. The hot melt pressure sensitive adhesive according to claim 4 wherein the hydrophilic acidic monomer is an ethylenically unsaturated carboxylic acid.

6. The hot melt pressure sensitive adhesive according to claim 1 wherein the plasticizing agent is selected from the group consisting of polyalkylene oxides, alkyl or aryl functionalized polyalkylene oxides, benzoyl functionalized polyethers, monomethyl ethers of polyethylene oxides and mixtures thereof.

7. A method for preparing a hot melt pressure sensitive adhesive comprising the steps of:
    (a) combining a solventless polymerizable mixture comprising:
        (i) about 30 to about 70 parts by weight of an (meth) acrylate ester wherein the (meth)acrylate ester, when homopolymerized, has a Tg of less than about 10° C.;
        (ii) about 70 to about 30 parts by weight of a hydrophilic acidic comonomer; and
        (iii) about 10 to 100 parts based on 100 parts of the sum of components (i) and (ii) of a non-volatile, non-reactive plasticizing agent;
    (b) enveloping the polymerizable mixture in a thermoplastic packaging material;
    (c) polymerizing the solventless polymerizable mixture to form the pressure sensitive adhesive that adheres to wet substrate surfaces, said pressure sensitive adhesive having a flow temperature, wherein the thermoplastic packaging material has a melting temperature lower than the flow temperature of the pressure sensitive adhesive.

8. A method for preparing a hot melt pressure sensitive adhesive comprising the steps of:
    (a) combining a solventless polymerizable mixture comprising:
        (i) about 30 to about 70 parts by weight of an (meth) acrylate ester wherein the (meth)acrylate ester, when homopolymerized, has a Tg of less than about 10° C.;
        (ii) about 70 to about 30 parts by weight of a hydrophilic acidic comonomer; and
        (iii) about 10 to 100 parts based on 100 parts of the sum of components (i) and (ii) of a non volatile, non-reactive plasticizing agent;
    (b) enveloping the polymerizable mixture in a thermoplastic packaging material;
    (c) exposing the enveloped polymerizable mixture to sufficient radiation to polymerize the polymerizable mixture and to form the pressure sensitive adhesive that adheres to wet substrate surfaces, said pressure sensitive adhesive having a flow temperature, wherein the thermoplastic packaging material has a melting temperature lower than the flow temperature of the pressure sensitive adhesive.

9. A method for preparing a wet stick pressure sensitive adhesive comprising the steps of:
    (a) preparing a prepolymeric syrup comprising:
        (i) about 30 to about 70 parts by weight of an (meth) acrylate ester wherein the (meth)acrylate ester, when homopolymerized, has a Tg of less than about 10° C.; and
        (ii) about 70 to about 30 parts by weight of a hydrophilic acidic comonomer;

(b) combining the prepolymeric syrup with about 10 to 100 parts based on 100 parts of the sum of components (i)+(ii) of a non-reactive plasticizing agent to form a polymerizable mixture;

(c) enveloping the polymerizable mixture in a thermoplastic packaging material;

(d) exposing the enveloped polymerizable mixture to sufficient radiation to polymerize the polymerizable mixture and to form the pressure sensitive adhesive that adheres to wet substrate surfaces.

10. The hot melt pressure sensitive adhesive of claim 1, wherein the packaging material is selected from ethylene-vinyl acetate, ethylene-acrylic acid, polypropylene, polyethylene, polybutadiene, or ionomeric materials.

11. The hot melt pressure sensitive adhesive of claim 1, wherein the packaging material is selected from ethylene-vinyl acetate or ethylene-acrylic acid.

12. An article comprising:

a substrate; and a hot melt pressure sensitive adhesive applied to a surface of said substrate, said hot melt adhesive comprising a mixture of a pressure sensitive adhesive having a flow temperature and a thermoplastic material having a melting temperature that is less than the flow temperature of the pressure sensitive adhesive, said pressure sensitive adhesive comprising (a) about 30 to about 70 parts by weight of an (meth) acrylate ester monomer wherein the (meth)acrylate ester monomer, when homopolymerized, has a Tg of less than about 10° C.;

(b) about 70 to about 30 parts by weight of a hydrophilic acidic comonomer; and (c) about 10 to 100 parts based on 100 parts (a)+(b) of a non-reactive plasticizing agent.

13. The article of claim 12, wherein the thermoplastic material is selected from ethylene-vinyl acetate, ethylene-acrylic acid, polypropylene, polyethylene, polybutadiene, or ionomeric materials.

14. The article of claim 12, wherein the thermoplastic material is selected from ethylene-vinyl acetate or ethylene-acrylic acid.

15. The article of claim 12, wherein the mixture further comprises a crosslinking agent.

16. The article of claim 12, wherein the (meth)acrylate ester monomers has the following general formula:

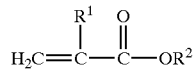

wherein $R^1$ is H or $CH_3$, the latter corresponding to where the (meth)acrylate monomer is a methacrylate monomer and $R^2$ is linear or branched hydrocarbon groups and may contain one or more heteroatoms and the number of carbon atoms in the hydrocarbon group is about 4 to about 12.

17. The article of claim 12, wherein the hydrophilic acidic monomer is ethylenically unsaturated carboxylic acids, ethylenically unsaturated sulfonic acids, ethylenically unsaturated phosphonic acids, or mixtures thereof.

18. The article of claim 12, wherein the plasticizing agent is selected from the group consisting of polyalkylene oxides, alkyl or aryl functionalized polyalkylene oxides, benzoyl functionalized polyethers, monomethyl ethers of polyethylene oxides and mixtures thereof.

19. The article of claim 12, further comprising a wet surface, wherein the adhesive is positioned between the substrate and the wet surface and wherein the adhesive adheres to the wet surface.

20. The method of claim 7, further comprising adhering the pressure sensitive adhesive to a wet surface.

21. The method of claim 8, further comprising adhering the pressure sensitive adhesive to a wet surface.

22. The method of claim 9, further comprising adhering the pressure sensitive adhesive to a wet surface.

23. The hot melt pressure sensitive adhesive of claim 1, wherein the thermoplastic material is selected from ethylene-vinyl acetate, ethylene-acrylic acid, polypropylene, polyethylene, polybutadiene, or ionomeric materials.

24. The hot melt pressure sensitive adhesive of claim 1, wherein the thermoplastic material is selected from ethylene-vinyl acetate or ethylene-acrylic acid.

* * * * *

UNITED STATES PATENT AND TRADEMARK OFFICE
CERTIFICATE OF CORRECTION

PATENT NO. : 6,855,386 B1
DATED : February 15, 2005
INVENTOR(S) : Daniels, Michael P.

It is certified that error appears in the above-identified patent and that said Letters Patent is hereby corrected as shown below:

Column 4,
Line 56, after "comonomer" delete "," and insert -- ; --, therefor.

Column 7,
Line 11, after "parts" delete ":".

Column 9,
Line 16, delete "beat" and insert -- heat --, therefor.

Column 10,
Line 24, delete "6hexanedioldiacrylate" and insert -- 6-hexanedioldiacrylate --, therefor.
Line 26, after "(4-methoxyphenyl)" insert -- - --.
Line 27, delete "4bis(trichloromethyl)" and insert -- 4-bis(trichloromethyl) --, therefor.
Lines 27-28, delete "6(3,4dimethoxyphenyl)" and insert -- 6-(3,4-dimethoxyphenyl) --, therefor.

Column 12,
Line 23, after "sheet" delete ",".

Column 13,
Line 5, delete "J=2" and insert -- $J = 2 \frac{AX}{hf}$ --, therefor.

Columm 14,
Line 17, delete "Cm$^2$" and insert -- cm$^2$ --, therefor.
Line 53, after "cut" delete "to" and insert -- into --, therefor.

UNITED STATES PATENT AND TRADEMARK OFFICE
CERTIFICATE OF CORRECTION

PATENT NO. : 6,8558,386 B1
DATED : February 15, 2005
INVENTOR(S) : Daniels, Michael P.

It is certified that error appears in the above-identified patent and that said Letters Patent is hereby corrected as shown below:

Column 15,
Line 12, insert -- these -- before "tests.
Line 60, delete "Example" and insert -- Examples --, therefor.

Signed and Sealed this

Seventeenth Day of May, 2005

JON W. DUDAS
*Director of the United States Patent and Trademark Office*